United States Patent [19]
Christy et al.

[11] Patent Number: 5,397,623
[45] Date of Patent: Mar. 14, 1995

[54] MAGNETIC TONER OFFSETTING SPOT

[75] Inventors: Orrin D. Christy, North Tonawanda; Dominick L. Monico, Williamsville, both of N.Y.

[73] Assignee: Moore Business Forms, Inc., Grand Island, N.Y.

[21] Appl. No.: 9,113

[22] Filed: Jan. 26, 1993

[51] Int. Cl.⁶ .................. B32B 27/14; B41M 3/12
[52] U.S. Cl. .................. 428/195; 428/211; 428/914; 235/493; 283/82
[58] Field of Search .................. 428/195, 211, 914; 235/493; 283/82

[56] References Cited

U.S. PATENT DOCUMENTS

| | | | |
|---|---|---|---|
| 2,547,838 | 4/1951 | Russell | 283/82 |
| 2,744,031 | 5/1956 | Mumma | 117/36 |
| 3,136,424 | 6/1964 | Silverschotz | 209/111.5 |
| 3,270,882 | 9/1966 | Perotto | 209/74 |
| 3,619,290 | 11/1971 | Deegan | 117/235 |
| 4,218,612 | 8/1980 | Krehl et al. | 235/449 |
| 4,283,708 | 8/1981 | Lee | 340/146.3 Z |
| 4,734,643 | 3/1988 | Bubenik et al. | 324/232 |

*Primary Examiner*—George F. Lesmes
*Assistant Examiner*—Kathryne E. Shelborne
*Attorney, Agent, or Firm*—Nixon & Vanderhye

[57] ABSTRACT

A method of facilitating marking of a document, and reading the markings on the marked document, utilizes conventional magnetic reading equipment. First indicia inviting marking of a first face of a document substrate is imaged on that face, while on the second, opposite face, in alignment with the first indicia, dense magnetic electronic imaging toner spaced elements are imaged. The toner is not heat fused. A second substrate portion is disposed in contact with the second face of the first substrate portion, and by rubbing on the first face (as with a pen or pencil) magnetic toner is transferred to the second substrate. The transferred magnetic toner is then sensed, through the paper forming the substrate, automatically. A business form is constructed typically by C-folding a single sheet of paper, imaged as described, about a fold line disposed between the first and second substrate portions. Machine readable magnetic addressee indicia is also preferably imaged on the second substrate, while human readable addressee indicia is imaged on the first face of the first substrate and is readable through a cutout in a fold-over portion of the business form.

19 Claims, 3 Drawing Sheets

MAGNETIC TONER OFFSETTING SPOT

BACKGROUND AND SUMMARY OF THE INVENTION

There are many circumstances in which it is desirable to send out questionnaires or ballots, and then to be able to quickly and effectively compile the responses from the questionnaires or ballots that are received. It is desirable to accomplish this function in a simple low-tech manner that offers reliability. According to the present invention, a method and a business form are provided which facilitate achievement of these desired results.

The method according to the invention, in a simple, low-tech manner, facilitates marking of a document and reading markings on the marked document, the document including a substrate with first and second faces. The method according to the invention comprises the following steps: (a) Imaging on a first face of a first substrate portion first indicia inviting marking of the substrate at that indicia. (b) Imaging on a second face of the first substrate, in alignment with the first indicia on the first face, dense magnetic electronic imaging toner spaced elements. (c) Refraining from post heat fusing the magnetic electronic imaging toner. (d) Providing a second substrate portion first face in contact with the second face of the first substrate portion. (e) Rubbing on the first face of the first substrate at the indicia in order to transfer magnetic toner from the second face of the first substrate portion to the first face of the second substrate portion. And, (f) automatically sensing the transferred magnetic toner on the first face of the second substrate portion.

Typically, the substrate is paper and step (b) is practiced directly on the paper of the substrate (that is, without any precoating with release material). Step (e) is typically practiced by marking the first face of the first substrate portion with a pen or pencil so as to simultaneously mark the first face and transfer toner to the second substrate portion, as by completely filling a closed indicia area (e.g., box or circle). The first and second substrate portions are preferably on the same sheet of paper, which is mechanically folded to provide the second portion specifically below the first portion. Step (b) is typically practiced to provide toner which completely covers—to the naked eye—the substrate second face at the spaced elements. Steps (a) through (d) are practiced on the sheet of paper in the production of business forms, and the folding step is preferably practiced to C-fold to provide the sheet as a C-folded form to provide the first face of the first substrate portion on top of the first face of the second substrate portion.

The method also comprises the further steps of imaging an outgoing address on the first face of the first substrate portion, and forming a cutout in the sheet so that when the sheet is C-folded the cutout overlies the outgoing address. Selectively activatable adhesive is also applied on the first face of the second portion of the substrate adjacent the second face of the first substrate portion to allow sealing of the marked questionnaire or ballot to return to the original mailing operation, and in order to facilitate this a line of weakness is formed between the first and second substrate portions. Also, preferably, magnetic indicia is imaged on the second substrate portion first face indicating identifying indicia of the person practicing step (e), and step (f) is practiced also to automatically sense that identifying indicia at the same time the questionnaire or ballot marking is sensed.

The invention also relates to a business form, preferably a mailer type business form in the configuration of a ballot or questionnaire. The business form comprises: A first substrate portion having first and second faces. A second substrate portion having a first face. First indicia imaged on the first substrate portion first face inviting marking of the substrate at that indicia. Transferable magnetic media disposed on the second face of the first substrate portion essentially only at the first indicia. And, the second substrate portion first face in removable contact with the second face of the first portion.

The transferable magnetic media preferably comprises non-heat fused dense magnetic electronic imaging toner (such as conventional MIDAX ® toner), and the first and second substrate portions are preferably provided by an integral sheet of paper separated by a fold line (which may be a line of weakness such as a perforation). Other indicia, particularly magnetic material, may be imaged on the second substrate portion first faced in alignment with the transferable magnetic media, to facilitate reading of the transferred magnetic media. Also, machine readable magnetic addressing-identifying indicia is provided on the first face of the second substrate portion. Human readable address-identifying indicia is also provided on the first face of the first substrate portion. Typically, the sheet is C-folded, having a third substrate portion on the opposite side of the first portion from the second portion, and having a cutout aligned with the human readable addressee-identifying indicia. Selectively activatable adhesive (such as rewettable adhesive) is disposed on the first face of the second substrate portion adjacent the fold line, and repositional adhesive is preferably disposed on the second face of the first substrate portion remote from the fold line, and on the third substrate portion on a part thereof remote from the second substrate portion.

The transferable magnetic media is preferably disposed directly on the second substrate face of the first substrate portion, with no intervening coating.

It is the primary object of the present invention to provide a simple yet effective low-tech approach to marking and reading business forms such as questionnaires and ballots. This and other objects of the invention will become clear from an inspection of the detailed description of the invention and from the appended claims.

BRIEF DESCRIPTION OF THE DRAWINGS

FIG. 1 is a top plan view of one face of a business form intermediate according to the invention, while

DETAILED DESCRIPTION OF THE DRAWINGS

Figure 1:
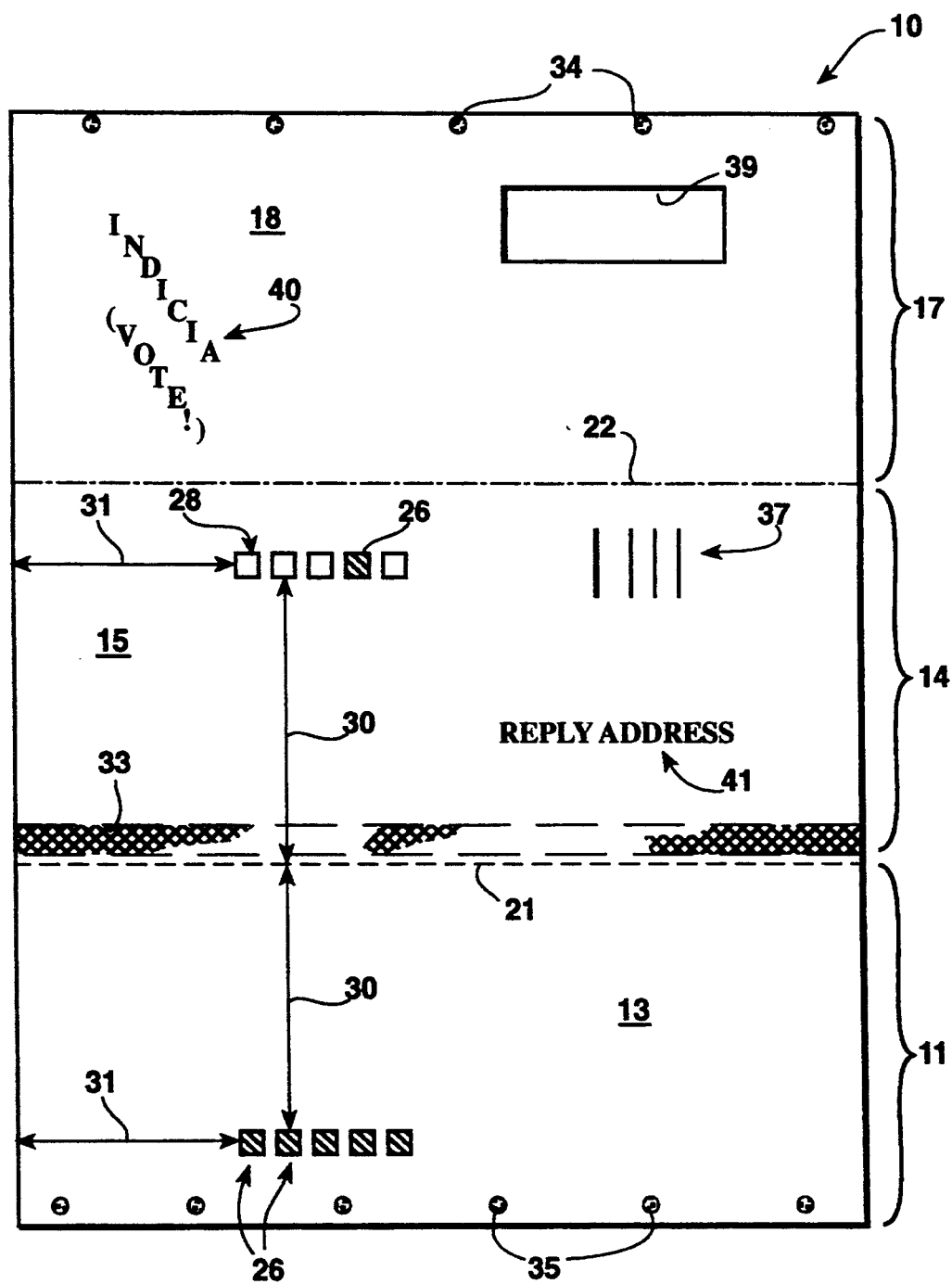
Figure 2:
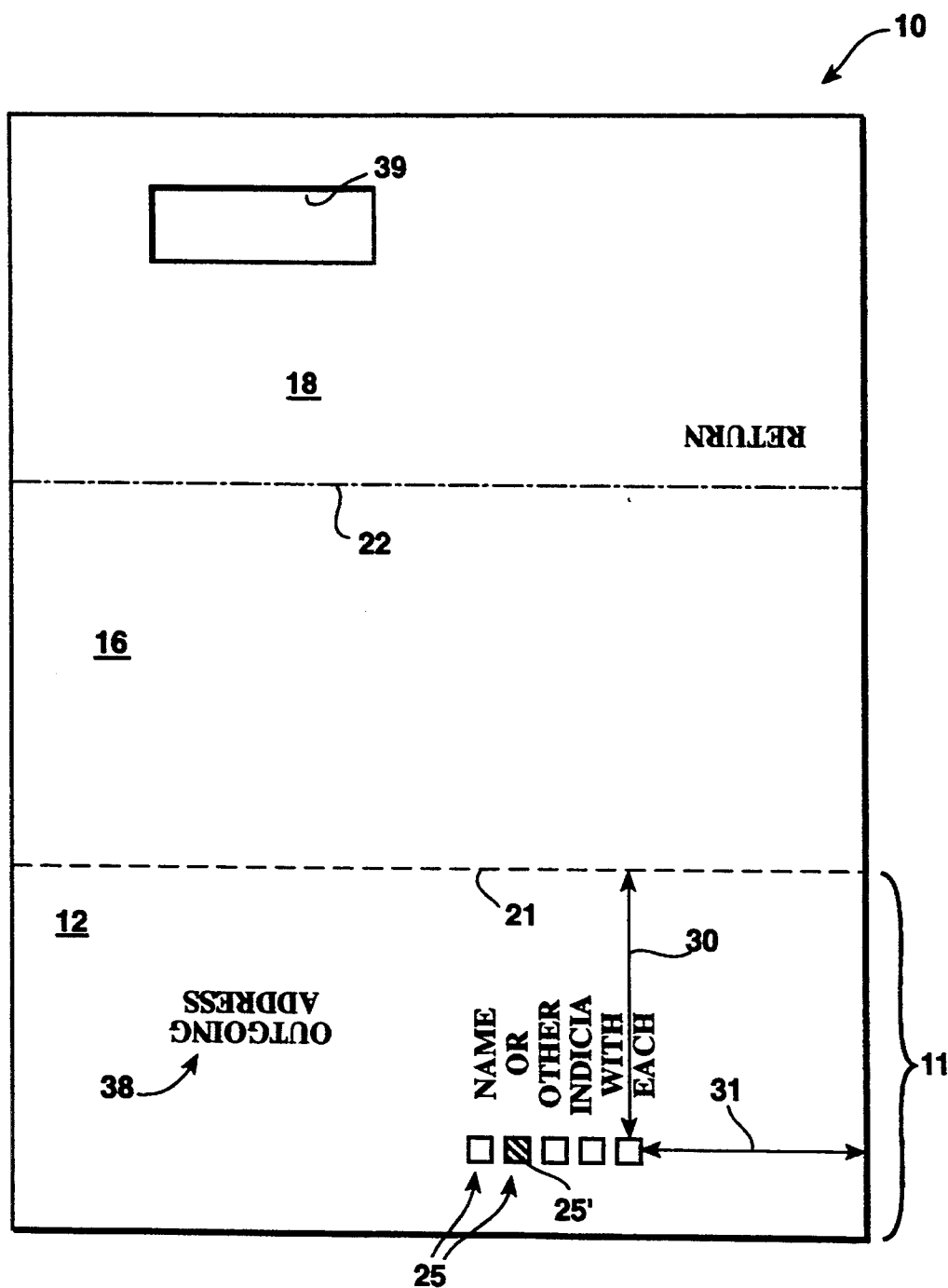
FIG. 2 is a top plan view of the opposite face thereof.

An exemplary business form intermediate according to the invention is shown generally by reference numeral 10 in FIGS. 1 and 2. It includes a first substrate portion 11 having a first face 12 and a second face 13, a second substrate portion 14 having a first face 15 and second face 16, and a third substrate portion 17 having a first face 18 and a second face 19. A first fold line 21, which preferably is a line of weakness such as a perforation line, is provided between the first and second substrate portions 11, 14, while a second fold line 22 is provided between the third substrate portion 17 and the second substrate portion 14, the lines 21, 22 being parallel. All of the portions 11, 14, 17 preferably are part of the same integral paper sheet.

Electronically imaged, or otherwise disposed, on the first face 12 of the first portion 11 are first indicia 25 inviting marking of the first face 12 substrate at that indicia. For example, indicia 25 preferably are boxes or circles, with names or questions adjacent the boxes or circles, so that the business form produced from the intermediate 10 is in the form of a ballot or questionnaire, inviting the recipient of the business form to vote for various people or issues, or to provide a "yes", "no", "don't know", or the like response to various questions.

Imaged on the second face 13 of the first substrate portion 11 in alignment with the closed indicia areas 25 are spaced elements of transferable magnetic media 26 (see FIG. 1). It is preferred that the media 26 be imaged directly on the paper forming the face 13 of the substrate first portion 11, there being no necessity for any release coating or the like. The transferable magnetic media 26 is disposed essentially only at the indicia 25 so that upon marking of the indicia 25 where invited transferable magnetic media 26 will be rubbed off from the second faced 13 onto an underlying element (that is, the first face 15 of the second substrate portion 14 in the embodiment illustrated in the drawings).

The transferable magnetic media 26 preferably comprises non-heat fused magnetic electronic imaging toner, that has been densely imaged on the face 13 so that to the naked eye it completely covers those portions of the face 13 underlying the closed indicia areas 25. For example, conventional MIDAX® magnetic toner may be utilized if one refrains from heat fusing the toner after imaging.

Below the transferable magnetic media 26, when the intermediate 10 is folded into a business form, is the first face 15 of the second substrate portion 14. Indicia 28 may be printed on the face 15 in alignment with the spaced transferable magnetic media elements 26 on the face 13 of the first substrate portion 11, to provide a visual double check to the person marking the ballot or questionnaire. FIG. 1 shows one of the closed indicia boxes forming the indicia 28 having been filled with transferred magnetic media 26 obtained by rubbing one of the boxes 25, particularly box 25' illustrated in FIG. 2, with a pen or pencil (which also simultaneously marks the face 12).

Note that the indicia 25, transferable magnetic media 26, and indicia 28 are all aligned with each other, the distances 30 and 31 on each of the faces 12, 13, 15, being the same.

The intermediate 10 also preferably comprises selectively activatable adhesive (such as rewettable adhesive or transfer tape) 33 disposed on the face 15 typically immediately adjacent the perforation line 21 (see FIG. 1). Repositional adhesive dots 34, 35 are also preferably provided along the edge of the third substrate portion 17 most remote from the fold line 22, and the edge of the first substrate portion 11 most remote from the fold line 21.

According to the present invention, it is also highly desirable to print the name, or other identifying indicia, of the addressee of the business form according to the invention, ostensibly the person or household who has filled out or is expected to fill out the ballot or questionnaire. This information is preferably printed in machine readable magnetic indicia (ink or toner) 37 as indicated in FIG. 1, on face 15 adjacent the indicia 28. If magnetic toner is used for the indicia 37, it can be heat fused. The same name or other identifying indicia is also printed, as indicated at 38 in FIGS. 2 and 3, on the first face 12 of the first substrate portion 11, as the name of the outgoing addressee 37. A cutout or window 39 (which may or may not be covered with a transparent patch) is provided in the third substrate portion 17 in alignment with the outgoing addressee indicia 38 so that when the intermediate 10 is C-folded about first the fold line 21 and then the second fold line 22 (as illustrated in FIG. 3) the outgoing addressee indicia 38 is visible through the cutout 39.

Figure 3:
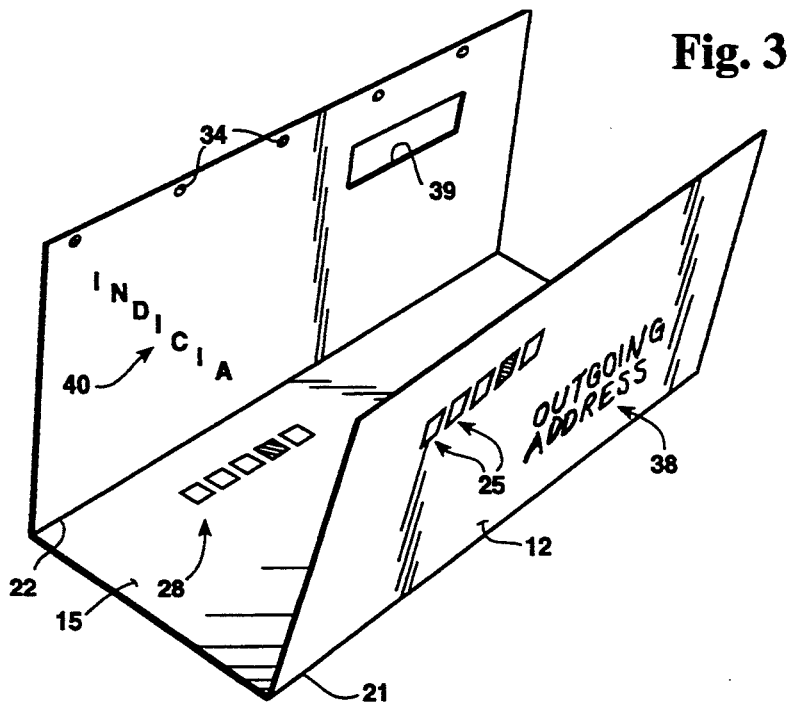
FIG. 3 is a top perspective view showing the intermediate of FIGS. 1 and 2 being folded to a business form.

Of course, other indicia—such as instructions as to how to fill out the ballot or questionnaire or the like—is also preferably printed on the business form, as indicated at 40 in FIGS. 1 and 3. Also, preferably human readable reply addressee indicia 41 is printed on the face 15 below the indicia 37, and in alignment with the cutout 39 so that in a return configuration of the business form the reply addressee indicia 41 is visible through the cutout 39 (see FIG. 4).

FIG. 3 shows C-folding of the intermediate 10 to form the business form according to the invention. When the first portion 11 is folded about the fold line 21, the second face 13 thereof comes into contact with the first face 15 of the second substrate portion 14, and the repositional adhesive dots 35 hold it in that position. When the third substrate portion 17 is folded about the fold line 22, the repositional adhesive dots 34 thereof come in contact with the face 12, holding it in place, with the outgoing addressee indicia 38 visible through the cutout window 39. C-folding is preferably practiced mechanically.

Once the business form is received by the outgoing addresses, he or she opens it by pulling up on the third substrate portion 17, which readily releases the repositional adhesive 34. With the substrate portions 11, 14 still in face-to-face engagement, the outgoing addressee then marks the ballot or answers the questionnaire, as by filling in one or more closed indicia areas 25, preferably using a pen or pencil which also simultaneously marks the face 12. When that is done, the non-fused magnetic toner 26 on the second face 13 of the first portion 11 is rubbed off onto the first face 15 of the second substrate portion 14 at the area of the indicia 28. When marking is completed, the portion 15 is removed by detaching at the perf line 21, and that may be kept by the outgoing addressee as her or his record copy.

To mail the ballot or questionnaire back to the reply addressee, the outgoing addressee then activates the rewettable adhesive 33, and folds the third substrate portion 17 about the second fold line 22 into contact with the rewettable adhesive 33 (see FIG. 4), with the reply addressee indicia 41 visible through the window 39.

Figure 4:
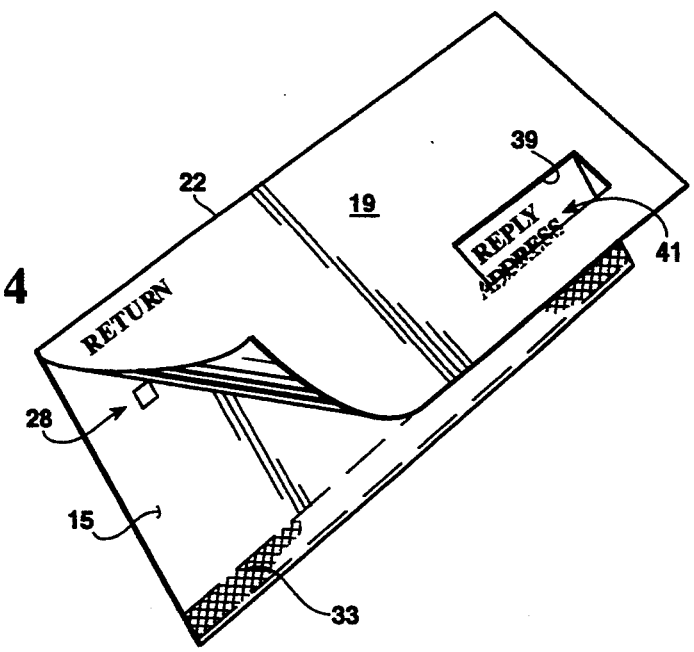
FIG. 4 is a top perspective view showing the business form of FIG. 3 after the ballot or questionnaire thereof has been marked and it is ready to be mailed back to the original sender.

When the return form of FIG. 4 is received by the original sender of the ballot or questionnaire, the response to the ballot or questionnaire may be read automatically by sensing the magnetic media on the face 15. This is preferably accomplished without opening of the business form, reading taking place directly through the paper third portion 17, utilizing conventional equipment such as a scanner manufactured by Docutronix of Florida. One form of such a scanner is shown in U.S. Pat. No. 4,218,612. Of course, at the same time that the ballot or questionnaire markings (transferred toner 26) are being read, the name or other identifying indicia (such as merely the city or state, for demographic survey purposes) 37 is also sensed by the magnetic sensor.

Figure 5:
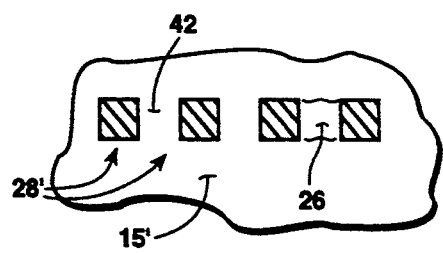
FIG. 5 is a detail view showing an alternative configuration of a second substrate first face which facilitates reading of the marked ballot or questionnaire of FIGS. 1 through 4.

FIG. 5 illustrates a second embodiment of the invention in which the indicia on the first face of the second substrate portion 14 is different. That is, on the face 15' the indicia 28' comprises blocks of magnetic material with spaces 42 therebetween. The space 42 is large enough to accommodate the transferred magnetic media 26 from the face 13. The blocks of magnetic material 28' facilitate registration and reading of the "votes" determined by the transferred magnetic media 26.

It will thus be seen that according to the present invention a method for facilitating marking of the documents and reading markings on the document, and a business form specifically for taking advantage of that method, have been provided. While the invention has been herein shown and described in what is presently conceived to be the most practical and preferred embodiment thereof, it will be apparent to those of ordinary skill in the art that many modifications may be made thereof within the scope of the appended claims, which are to be interpreted to cover all equivalent methods and products.

What is claimed is:

1. A business form comprising a substrate:
a first substrate portion having first and second, faces;
a second substrate portion having a first face;
first indicia imaged on said first substrate portion first face inviting marking of the substrate at that indicia;
transferable magnetic media disposed on said second face of said first substrate portion essentially only at said first indicia; and
said second substrate portion first face in removable contact with said second face of said first portion.

2. A business form comprising:
a first substrate portion having first and second faces;
a second substrate portion having a first face;
first indicia imaged on said first substrate portion first face inviting marking of the substrate at that indicia;
transferable non-heat fused dense magnetic electronic imaging toner disposed on said second face of said first substrate portion essentially only at said first indicia; and
said second substrate portion first face in removable contact with said second face of said first portion.

3. A business form as recited in claim 1 wherein said first and second substrate portions comprise an integral sheet of paper separated by a fold line.

4. A business form as recited in claim 3 wherein said fold line is a line of weakness.

5. A business form as recited in claim 1 further comprising further indicia imaged on said second substrate portion first face in alignment with said transferable magnetic media.

6. A business form as recited in claim 5 wherein said further indicia comprises magnetic material.

7. A business form as recited in claim 1 further comprising machine readable magnetic addressee-identifying indicia on said first face of said second substrate portion.

8. A business form as recited in claim 7 further comprising human readable addressee identifying indicia on said first face of said first substrate portion.

9. A business form as recited in claim 8 wherein said first and second substrate portions comprise an integral sheet of paper separated by a fold line.

10. A business form as recited in claim 9 wherein said sheet is C-folded, having a third substrate portion on the appropriate side of said first portion from said second portion, and having a cutout aligned with said human readable addressee identifying indicia.

11. A business form as recited in claim 10 further comprising human readable reply address indicia disposed on said second substrate portion first face in alignment with said cutout.

12. A business form as recited in claim 5 wherein said first indicia and said further indicia comprise ballot or questionnaire indicia, including boxes.

13. A business form as recited in claim 10 further comprising selectively activatable adhesive disposed on said first face of said second substrate portion adjacent said fold line.

14. A business form as recited in claim 13 further comprising repositional adhesive disposed on said second face of said first substrate portion remote from said fold line, and on said third substrate portion on a part thereof remote from said second substrate portion.

15. A business form as recited in claim 1 wherein said transferable magnetic media is disposed directly on said first substrate portion.

16. A business form comprising:
a first substrate portion having first and second faces;
a second substrate portion having a first face;
first indicia imaged on said first substrate portion first face inviting marking of the substrate at that indicia;
transferable magnetic media disposed directly on said second face of said first substrate portion, for transfer to said first face of said second substrate portion; and
said second substrate portion first face in removable contact with said second face of said first portion.

17. A business form comprising:
a first substrate portion having first and second faces;
a second substrate portion having a first face:
first indicia imaged on said first substrate portion first face inviting marking of the substrate at that indicia;
transferable non-heat fused dense magnetic electronic imaging toner disposed directly on said second face of said first substrate portion, for transfer to said first face of said second substrate portion; and
said second substrate portion first face in removable contact with said second face of said first portion, wherein said first face of the second substrate portion receives by transfer said transferable magnetic media.

18. A business form as recited in claim 17 wherein said first and second substrate portions comprise an integral sheet of paper separated by a fold line.

19. A business form comprising:
an integral web substrate separated by a fold line into a first and second substrate portions;

the first substrate portion having first and second faces, first indicia imaged on the first face of the first substrate portion to invite marking of the substrate at the indicia, transferable non-heat magnetic electronic imaging toner media disposed on the second face of the first substrate portion substantially only opposite the first indicia, and the second substrate portion having a first face in removable contact with the second face of the first substrate portion, and further indicia imaged on the first face of the second substrate portion in substantial alignment with the media.

* * * * *